US006778644B1

(12) United States Patent
Jenkins et al.

(10) Patent No.: US 6,778,644 B1
(45) Date of Patent: Aug. 17, 2004

(54) INTEGRATION OF VOICE MESSAGING AND DATA SYSTEMS

(75) Inventors: Paul D. Jenkins, Plano, TX (US); Peter M. White, Dallas, TX (US)

(73) Assignee: Vocada, Inc., Addison, TX (US)

( * ) Notice: Subject to any disclaimer, the term of this patent is extended or adjusted under 35 U.S.C. 154(b) by 55 days.

(21) Appl. No.: 10/035,407

(22) Filed: Dec. 28, 2001

(51) Int. Cl.⁷ .................................................. H04M 11/00
(52) U.S. Cl. ..................... 379/88.18; 709/206; 704/219
(58) Field of Search .......................... 379/88.18, 88.04, 379/88.11, 88.14, 88.17, 88.27, 88.23, 88.1; 455/413; 704/219; 709/206

(56) References Cited

U.S. PATENT DOCUMENTS

| | | | | |
|---|---|---|---|---|
| 4,327,251 A | * | 4/1982 | Fomenko et al. ........ 379/88.16 |
| 4,580,012 A | | 4/1986 | Matthews et al. ............ 179/18 |
| 4,580,016 A | | 4/1986 | Williamson ................. 179/175 |
| 4,581,486 A | | 4/1986 | Matthews et al. ............ 179/18 |
| 4,585,906 A | | 4/1986 | Matthews et al. ............ 179/18 |
| 4,602,129 A | | 7/1986 | Matthews et al. ............ 179/18 |
| 4,640,991 A | | 2/1987 | Matthews et al. ............ 379/88 |
| 4,652,700 A | | 3/1987 | Matthews et al. ............ 379/89 |
| 4,757,525 A | | 7/1988 | Matthews et al. ............ 379/89 |
| 4,761,807 A | | 8/1988 | Matthews et al. ............ 379/89 |
| 4,790,003 A | * | 12/1988 | Kepley et al. ........... 379/88.18 |
| 4,837,798 A | * | 6/1989 | Cohen et al. ............ 379/88.14 |
| 4,922,520 A | | 5/1990 | Bernard et al. ............... 379/88 |
| 4,972,462 A | | 11/1990 | Shibata ........................ 379/89 |
| 5,153,902 A | | 10/1992 | Buhl et al. .................... 379/57 |
| 5,245,650 A | | 9/1993 | Kim ............................. 379/89 |
| 5,260,986 A | | 11/1993 | Pershan ....................... 379/57 |
| 5,327,520 A | * | 7/1994 | Chen ......................... 704/219 |
| 5,355,406 A | | 10/1994 | Chencinski et al. .......... 379/88 |
| 5,406,557 A | | 4/1995 | Baudoin ....................... 370/61 |
| 5,414,757 A | | 5/1995 | Thompson ................... 379/88 |
| 5,519,766 A | | 5/1996 | Jones ........................... 379/74 |
| 5,524,140 A | | 6/1996 | Klausner et al. .............. 379/67 |
| 5,528,670 A | | 6/1996 | Elliot et al. ................... 379/89 |
| 5,530,739 A | | 6/1996 | Okada et al. ................. 379/89 |
| 5,555,297 A | | 9/1996 | Ochy et al. ................. 379/136 |
| 5,559,875 A | | 9/1996 | Bieselin et al. ............. 379/202 |
| 5,568,540 A | | 10/1996 | Greco et al. ................. 379/89 |
| 5,572,576 A | | 11/1996 | Klausner et al. .............. 379/67 |
| 5,590,178 A | | 12/1996 | Murakami et al. ............ 379/96 |
| 5,598,849 A | * | 2/1997 | Browne ...................... 600/520 |
| 5,619,554 A | | 4/1997 | Hogan et al. ................. 379/67 |
| 5,652,789 A | | 7/1997 | Miner et al. ................ 379/201 |
| 5,655,006 A | | 8/1997 | Cox, Jr. et al. ............... 379/89 |
| 5,675,507 A | * | 10/1997 | Bobo, II ..................... 709/206 |
| 5,680,444 A | | 10/1997 | Reeves ........................ 379/67 |
| 5,699,413 A | | 12/1997 | Sridhar ........................ 379/98 |
| 5,717,742 A | | 2/1998 | Hyde-Thomson ............ 379/88 |
| 5,771,276 A | | 6/1998 | Wolf ............................ 379/88 |
| 5,790,637 A | | 8/1998 | Johnson et al. ............... 379/67 |
| 5,802,510 A | | 9/1998 | Jones ............................ 707/2 |
| 5,838,774 A | | 11/1998 | Weisser, Jr. .................. 379/92 |

(List continued on next page.)

OTHER PUBLICATIONS

U.S. patent application Ser. No. 10/035,363 filed Dec. 28, 2001, entitled *Processing of Enterprise Messages Integrating Voice Messaging and Data Systems*, by Jenkins, et al.

*Primary Examiner*—Fan Tsang
*Assistant Examiner*—Gerald Gauthier
(74) *Attorney, Agent, or Firm*—Baker Botts L.L.P.

(57) ABSTRACT

An enterprise system includes multiple disparate information systems, such as voice and data systems. An integration server provides for the interaction of information between these systems through the use of enterprise messages and processing rules. Enterprise messages allow for the association of information from disparate information systems, while the processing rules allow for automated interaction between users and information in the disparate information systems.

25 Claims, 4 Drawing Sheets

U.S. PATENT DOCUMENTS

| | | |
|---|---|---|
| 5,841,839 A | 11/1998 | Fogg et al. ............... 379/88 |
| 5,844,968 A | 12/1998 | Choi ....................... 379/89 |
| 5,852,652 A | 12/1998 | Matsuoka ................ 379/88 |
| 5,893,098 A | 4/1999 | Peters et al. ............. 707/10 |
| 5,905,774 A | 5/1999 | Tatchell et al. .......... 379/88 |
| 5,923,733 A | 7/1999 | Binns et al. ............. 379/88 |
| 5,926,526 A | 7/1999 | Rapaport et al. ........ 379/88 |
| 5,966,351 A | 10/1999 | Carleton et al. ......... 369/29 |
| 5,970,125 A | 10/1999 | Smith et al. ............. 379/93 |
| 6,014,427 A | 1/2000 | Hanson et al. ........... 379/67 |
| 6,021,181 A | 2/2000 | Miner et al. ............. 379/88 |
| 6,047,053 A | 4/2000 | Miner et al. ........... 379/201 |
| 6,069,940 A | 5/2000 | Carleton et al. ......... 379/88 |
| 6,075,844 A | 6/2000 | Goldberg et al. ........ 379/88 |
| 6,104,711 A | 8/2000 | Voit ....................... 370/352 |
| 6,111,938 A | 8/2000 | Katoh ..................... 379/88 |
| 6,115,455 A | 9/2000 | Picard .................... 379/67 |
| 6,151,386 A | 11/2000 | Argade ................... 379/88 |
| 6,163,596 A | 12/2000 | Gelfer et al. ............. 379/67 |
| 6,181,926 B1 * | 1/2001 | LaRocca ................ 455/413 |
| 6,182,059 B1 | 1/2001 | Angotti et al. ........... 706/45 |
| 6,192,111 B1 | 2/2001 | Wu ......................... 379/88 |
| 6,330,308 B1 * | 12/2001 | Cheston et al. ...... 379/88.04 |
| 6,335,962 B1 * | 1/2002 | Ali et al. ............. 379/88.11 |
| 6,483,899 B2 * | 11/2002 | Agraharam et al. .. 379/88.14 |
| 6,535,583 B1 * | 3/2003 | Bobick et al. ....... 379/88.18 |

* cited by examiner

INTEGRATION OF VOICE MESSAGING AND DATA SYSTEMS

BACKGROUND OF THE INVENTION

In many organizations, voicemail systems are an integral part of internal and external communications. These voicemail systems support interaction and information exchange between members of the organization and other individuals by providing a variety of features for messaging one or more people. However, voicemail systems are limited in their ability to perform complex messaging tasks to support effective information exchange.

SUMMARY OF THE INVENTION

In accordance with the present invention, techniques for the integration of messaging and data systems are provided which substantially eliminate or reduce disadvantages and problems associated with previous techniques. In a particular embodiment, the present invention satisfies a need for the integration of voice messaging systems and enterprise data systems within an organization.

Embodiments of the invention provide various technical advantages. These techniques provide for information maintenance and exchange by integrating voice messaging with enterprise data systems. Particular embodiments provide for the association of information, such as voicemail messages with data files, to provide coordination among various information systems. For example, a presentation on effective sales techniques for targeting large organizations may be attached to a voicemail-message requesting help in targeting sales to IBM.

These techniques also provide for processing of associated information to support the effective exchange of information and automated maintenance and manipulation of enterprise data systems. For example, a voicemail message indicating a high probability of closing a large sale may result in the automated updating of enterprise resource planning systems, resulting in increased orders for parts necessary to fulfill the potential sale.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
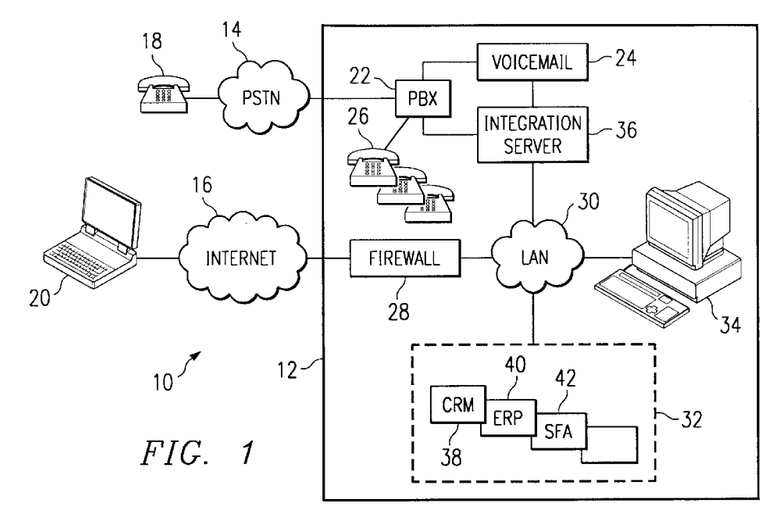
FIG. 1 illustrates a system having an enterprise information system including an integration server for integrating voice messaging systems with enterprise data systems.

FIG. 1 illustrates a system, indicated generally at 10, that includes an enterprise system 12 coupled via networks, such as a public switched telephone network (PSTN) 14 and the Internet 16, to external devices, such as external voice interface 18 and external data interface 20. Enterprise system 12 includes voice communication components, such as a voice switch 22, a voicemail system 24, and internal voice interfaces 26. Enterprise system 12 also includes data communication components, such as a firewall 28, a local area network (LAN) 30, enterprise data systems 32, and internal data interfaces 34. In addition, enterprise system 12 includes an integration server 36. In general, server 36 integrates information and features of both voice components and data components of system 12.

Enterprise system 12 represents any suitable collection of components from one or more organizations providing for maintenance of information and for the exchange of voice and data information among various system users. In the example illustrated, these components include voice interaction components and data interaction components as well as server 36, which provides for integration of information from the voice and data components. The voice components of enterprise system 12 provide connectivity for voice communications and other functions related to voice communications, such as the maintenance of stored voice messages. Voice switch 22 provides a link to outside voice communication networks, such as PSTN 14, and provides voice communication channels for users of enterprise system 12. For example, voice switch 22 supports voice communication channels between external voice interfaces 18 and components within enterprise system 12, such as voicemail 24, internal voice interfaces 26, and server 36. However, while this example illustrates voice switch 22 as a private branch exchange (PBX), system 10 contemplates enterprise system 12 implementing voice switch 22 using any suitable technology. Thus, voice switch 22 may include any hardware and associated logic supporting voice communications, such as circuit switched and/or packet-based communication equipment.

Voicemail 24 provides voicemail features and functionality for users of enterprise system 12. For example, voicemail 24 may include voice mailboxes for any number of users associated with enterprise system 12. Using voice interfaces 18 or 26, users may access voicemail 24 through voice switch 22 to access mailboxes, leave messages, and perform other appropriate voicemail tasks.

Within enterprise system 12, data processing elements provide for storage, access, maintenance, and manipulation of data. Firewall 28 provides connectivity between elements of enterprise system 12 and external devices by linking to external networks, such as the Internet 16 or other suitable data networks. LAN 30 provides for the transport of information between various components of enterprise system 12 and provides data interfaces 20 and 34 access to each other and to server 36 and enterprise data systems 32. Thus, LAN 30 may include any suitable collection and arrangement of communications elements. Moreover, while labeled as a local area network, system 10 contemplates LAN 30 encompassing any suitable networks for linking elements within enterprise system 12.

Enterprise data systems 32 represent applications and equipment for maintaining organizational information for enterprise system 12. In the example illustrated, enterprise data systems 32 include a customer relationship management (CRM) application 38, an enterprise resource planning (ERP) application 40 and a sales force automation (SFA) application 42. CRM 38 maintains information on customers associated with enterprise system 12, such as customer account information. ERP 40 maintains information relating to the operation and management of various tasks associated with enterprise system 12. This may include information and/or forecasts that support the procurement of parts and equipment necessary for fulfilling orders and/or potential orders from customers of enterprise system 12. SFA 42 includes information describing the sales force associated with enterprise system 12, such as data on the sales and activities of particular sales representatives associated with enterprise system 12. In addition, while the particular examples illustrated provide specific instances of data maintained by enterprise system 12, enterprise data systems 32 may include any suitable information for the organization associated with enterprise system 12, with stored information maintained using any appropriate data storage technology.

Within enterprise system 12, server 36 provides for the interaction and integration of information between voice components and data components. Server 36 represents any suitable combination and arrangement of hardware and associated logic for interfacing with users and processing data and voice information. In operation, server 36 develops and processes constructs, referred to as enterprise messages, that include various combinations of voice messages, enterprise data, and categorization data related to the enterprise message. Through interaction with system users various system elements, server 36 handles the creation and processing of enterprise messages.

To create an enterprise message, server 36 initially interacts with a user over a voice channel. For example, server 36 may establish a voice channel through voice switch 22 to voice interface 18 or 26. Similarly, server 36 may establish a voice channel through a data network, such as a voice channel through LAN 30 to data interface 20 or 34. Using the voice channel, server 36 elicits a voicemail message from the user. In addition, server 36 also develops categorization data based on information received from the user. According to particular embodiments, server 36 generates one or more voice prompts to elicit categorization data from the user. For example, using a voice response unit (VRU), server 36 may request information from the user for categorizing an enterprise message that includes the voicemail message. This may include information such as account names, customer names, message summaries, voicemail descriptions, and/or any other suitable information for categorizing the enterprise message. In addition to using prompts to elicit categorization data from a user, server 36 may also (or alternatively) use speech to text technology to extract categorization data from the voicemail message received from the user. The categorization data permits server 36 to link a resulting enterprise message to one or more enterprise data systems 32. For example, upon determining that a voicemail message includes a sales update, server 36 may determine the appropriate customer account from CRM 38 to which the update applies.

This voicemail message and the associated categorization data form the basis of an enterprise message. To store these enterprise messages, server 36 may have access to internal and/or external memory devices. Moreover, server 36 may store enterprise messages and/or portions of enterprise messages in one or more locations. For example, server 36 may store voicemail messages in voicemail 24 while internally maintaining enterprise messages with categorization data and pointers to particular voicemail messages.

In addition to handling enterprise message creation, server 36 also processes enterprise messages based upon automated rules and/or interactions with system users. According to particular embodiments, server 36 processes enterprise messages based upon a set of processing rules. These rules set forth actions for server 36 to take given the occurrence of particular events. According to a particular embodiment, each rule specifies an event and an action and may also specify conditional statements as well as exceptions to the rule. For example, a particular rule may state that upon message creation, if the enterprise message relates to a specific account name, then server 36 should generate a notification to a particular address, except when the priority of the enterprise message is low. Thus, this example message includes an event (message creation), an action (notification), a conditional clause (if the message relates to an account), and an exception (for a low message priority). Events for rules may include occurrences such as message creation, message modification, expiration of time periods, or other suitable events. Conditional statements and/or exceptions qualify the occurrence of the event. Therefore, server 36 only performs an action specified by a rule given the occurrence of an event and the satisfaction of conditional statements and exceptions.

Each rule may specify one or more actions for server 36 to take. These actions include tasks such as message routing, notifications, message attachments, and data manipulation. Routing rules identify voice mailboxes, external systems, entities (such as a particular enterprise message account), or other appropriate targets for receiving copies of the enterprise message. Thus, when executing a rule specifying routing of an enterprise message, server 36 forwards some or all of the enterprise message to the target or targets specified by the rule. For example, for a routing rule targeting a voice mailbox, server 36 may forward only voicemail messages from the enterprise message to the indicated voice mailbox (and potentially an indication that additional information is available). A routing rule specifying an entity, such as a project manager for a customer account, will result in server 36 forwarding a copy of the entire enterprise message. In addition, when forwarding an enterprise message, server 36 may augment the categorization data of the enterprise message to indicate the particular routing rule resulting in the forwarded enterprise message.

Notification rules identify e-mail addresses, pager numbers, voice mailboxes, short message service addresses, telephone numbers, and/or other targets for receiving notification of the occurrence of an event associated with the enterprise message. For example, upon the creation of an enterprise message associated with a particular account and specifying a high probability for a large sale, a rule may specify particular addresses and phone numbers to be notified. In addition, notification rules may specify interactive functions to elicit additional information from one or more users. For example, an interactive notification rule may specify the telephone number for an administrator associated with an account specified in categorization data of an enterprise message. To execute the notification rule, server 36 establishes a voice channel with the administrator and, using VRU technology, elicits authorizations and/or other suitable responses from the administrator. Thus, these interactive notifications support tasks such as authorizations of pending actions, updates to enterprise messages, clarifications of information in enterprise messages, modifications to enterprise messages, additions to enterprise messages, and other appropriate tasks.

Rules may also specify links to data files in enterprise data systems 32 for attachment to an enterprise message. For example, an enterprise message with categorization data specifying a request for help on particular sales techniques may trigger the attachment (or linking) of a PowerPoint presentation from an enterprise data system 32 that covers these techniques. Thus, an enterprise message may, in addition to categorization data and voice messages, include one or more data files. This permits the association of information from disparate systems, such as voicemail systems and data systems. By permitting these types of associations, system 10 supports the preservation of links between the associated information. For example, this permits the preservation of the context of a particular grouping of information within an enterprise message.

In addition to specifying message routing, notifications, and attachments, rules may also trigger modifications or updates to data in enterprise data systems 32. For example, server 36 may use categorization data in an enterprise message related to a particular customer to update CRM 38 given the occurrence of a triggering event, such as the creation or modification of the enterprise message. Consider a voicemail message identifying a point of contact for a particular customer. Upon generating appropriate categorization data relating to the voicemail message, server 36 may, in response to a rule, identify the customer in CRM 38 and automatically update the point of contact information. Similarly, server 36 may use categorization data to update or modify other information in enterprise data systems 32 when appropriately triggered. This fosters tight integration between voice and data systems, permitting partial or full automation of various management tasks of enterprise system 12. For example, upon receiving an appropriately authorized enterprise message indicating a sufficiently high opportunity win percentage for sales to a customer account, server 36 may update ERP 40 to schedule orders for parts necessary to fulfill the anticipated order. Likewise, a drop in an opportunity win percentage may trigger order reductions or cancellations.

In addition to actions taken automatically based on rules, server 36 also supports access by users to existing enterprise messages. For example, an administrator, using data interface 20 or 34 (or potentially through voice interface 18 or 26), may access server 36 to browse and potentially initiate processing of enterprise messages. In this manner, the actions specified by rules may also be initiated by appropriate users. Thus, categorization data, in conjunction with various processing rules, allows sorting, linking, nesting, and other manipulations of voice messages and related data systems.

Figure 2:
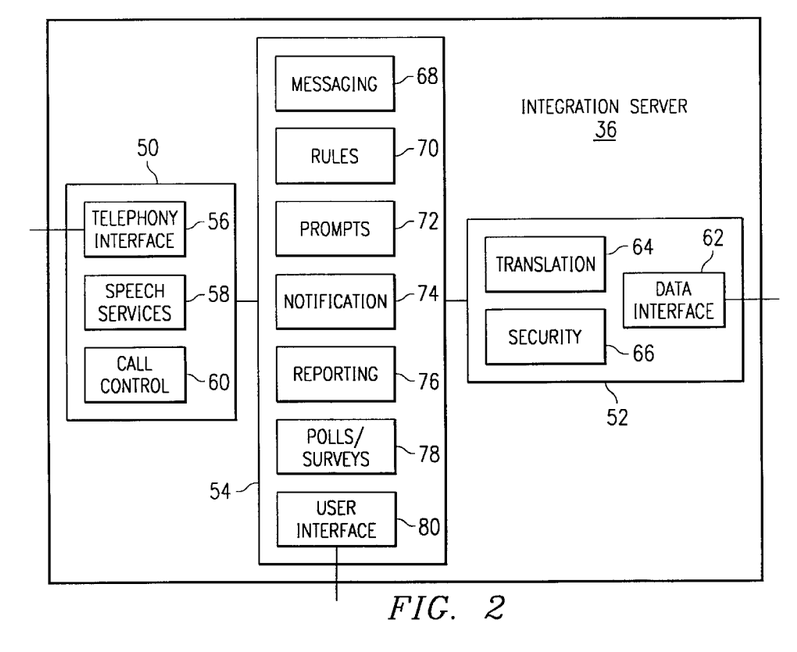
FIG. 2 is a block diagram illustrating functional modules of the integration server.

FIG. 2 is a block diagram illustrating exemplary functional modules of server 36 that include telephony services modules 50, data services modules 52, and telephony/data integration modules 54. Telephony services modules 50 include a telephony interface 56, speech services module 58, and a call control module 60. Data services modules 52 include a data interface 62, a translation module 64, and a security module 66. Integration modules 54 include a messaging module 68, a rules module 70, a prompts module 72, a notification services module 74, a reporting module 76, a polls/surveys module 78, and a user interface 80. In general, server 36 provides voice services, such as voicemail messaging, using telephony modules 50 and provides data services, such as access to enterprise data systems 32, using data modules 52. In addition, server 36 provides for integration of voice and data services and access to enterprise messages using integration modules 54.

Telephony services modules 50 represent hardware and associated logic for interfacing with users over voice communication channels. Telephony interface 56 couples server 36 to various communication networks using one or more physical and/or virtual ports. For example, telephony interface 56 may include ports for PSTN 14, LAN 30, and the Internet 16. Thus, telephony interface 56 supports various circuit-switched and packet-based communications protocols as appropriate for establishing voice communication channels. Speech services module 58 provides for processing of voice communication sessions, including interactive services. For example, speech services module 58 may provide dual-tone multi-frequency (DTMF) signal interpretation, automatic speech recognition (ASR) services, speech-to-text capabilities, and other appropriate speech related services.

Call control module 60 manages voice communications with users by controlling telephony services modules 50 and accessing integration modules 54 for information used during voice communication sessions. For example, call control module 60, using telephony interface 56, manages the establishment of voice communication sessions with users. Moreover, call control module 60 also manages processing for ongoing sessions. For example, call control module 60 may access information from prompts module 72 and use this information to generate prompts eliciting categorization data for use in generating an enterprise message. Thus, telephony services modules 50 support the establishment of voice communications to elicit voicemail messages and categorization data from users. Telephony services modules 50 may then pass this information on to integration modules 54 for the creation and/or modification of enterprise messages.

Data services modules 52 represent hardware and associated logic for coupling to data networks and interfacing with enterprise data systems 32. Thus, data interface 62 links to one or more data networks, such as LAN 30, to access enterprise data systems 32, such as CRM 38, ERP 40, and SFA 42. Translation module 64 manipulates data passing between integration modules 54 and outside data storage systems, such as enterprise data systems 32. For example, enterprise data systems 32 may include one or more disparate data storage systems using various data storage techniques and protocols. Translation module 64 allows for the retrieval, manipulation, and storage of information into other data systems by translating between protocols used by integration modules 54 and protocols used by the other data systems.

Security module 66 limits access to enterprise data systems 32, thus preventing unauthorized users from accessing and/or manipulating information stored in these systems. According to particular embodiments, security module 66 maintains information tracking access levels of various users and uses this information to moderate access to enterprise data systems 32. In short, data services modules 52 provide monitored access to enterprise data systems 32 to retrieve, manipulate, and store digital data files from these systems, potentially for incorporation within enterprise messages.

Integration modules 54 provide services for integrating voice and data services within enterprise system 12. Integration modules 54 provide for the creation and processing of enterprise messages and for the processing of information in enterprise data systems 32 based on these enterprise messages. In the particular embodiment illustrated, integration modules 54 include messaging module 68, rules module 70, prompts module 72, notification module 74, reporting module 76, polls/surveys module 78, and user interface 80.

Messaging module 68 supports the creation and processing of enterprise messages based upon information received from voice services modules 50 and data services modules 52. For example, messaging module 68 may receive a voice message and associated categorization data from telephony services modules 50 and generate and store an enterprise message incorporating the voice message and categorization data. In addition to message creation, messaging module 68 also processes enterprise messages based upon processing rules maintained by rules module 70. Thus, messaging module 68 may access enterprise data systems 32 using data services modules 52 to manipulate information or to attach digital data files to enterprise messages. For example, upon identifying a data file for attachment to an enterprise message based upon a processing rule or in response to a request from a user, messaging module 68 may access data services modules 52 to request an address for the identified data file and may then store this address within the enterprise message, thus linking the enterprise message to the data file.

Integration modules 54 also include functional modules for storing and/or processing enterprise messages and for providing other voice and data services. Rules module 70 maintains various processing rules for use by messaging module 68 in processing enterprise messages. For example, rules module 70 may include various routing rules, notification rules, data manipulation rules, and other appropriate processing rules for manipulating and/or processing enterprise messages. Prompts module 72 includes information for use by voice services module 50 when interacting with users. For example, prompts module 72 may maintain various prompts for use in eliciting categorization data from users during a voice communication session. Prompts module 72 may maintain these prompts in a "script" that specifies appropriate prompts based on previous responses. To determine appropriate prompts, prompts module 72 may access information in enterprise data systems 32 using data services modules 52. For example, to determine valid account names or customer names, prompts module 72 may access CRM 38.

Notification module 74 contacts individuals and/or entities in response to appropriate commands received from messaging module 68 based on notification rules or in response to commands received from a user through user interface 80. Reporting module 76 provides access to enterprise messages for various reporting functions. For example, a user may access integration modules 54 through user interface 80 and request access to enterprise messages of a particular type or containing specified categorization data. In response, reporting module 76 identifies appropriate enterprise messages and presents these messages to the user.

User interface 80 represents hardware and associated logic for interfacing integration modules 54 with various system users. Through user interface 80, users, such as system administrators, access integration modules 54 to view and manipulate enterprise messages. For example, an administrator may access integration modules 54 to attach data files from enterprise data systems 32 to enterprise messages, to attach voicemails to enterprise messages, to authorize various actions requiring approval, to configure processing rules and/or prompts, or to perform other suitable administrative tasks.

While the particular embodiment illustrated and the preceding description focus on a particular combination and arrangement of functional elements within server 36, system 10 contemplates server 36 including any appropriate combination and arrangement of elements for integrating voice and data services. Thus, specific elements illustrated and functionalities described may be separated, combined, rearranged, or otherwise modified, and any of these functionalities may be implemented using logic encoded in media. Furthermore, the embodiment illustrated separates modules primarily by functionality, and server 36 including and/or accessing any suitable equipment for performing each of these tasks. For example, server 36 may be a computer having one or more processors for executing various logic routines implementing some or all of the functionalities described above. In addition, while the embodiment illustrated includes various interfaces for voice, data, and user access, server 36 may include any suitable hardware and logic for linking to various communication systems and users. Moreover, server 36 may link to these systems using any number and type of links and communications protocols. For example, while the embodiment illustrated presents user interface 80 as a separate module, server 36 may interface with users, such as administrators, using telephony interface 56 and/or data interface 62. Thus the example provided by this embodiment is merely illustrative, and system 10 contemplates server 36 using any suitable hardware and/or logic for integrating voice and data systems.

Figure 3:
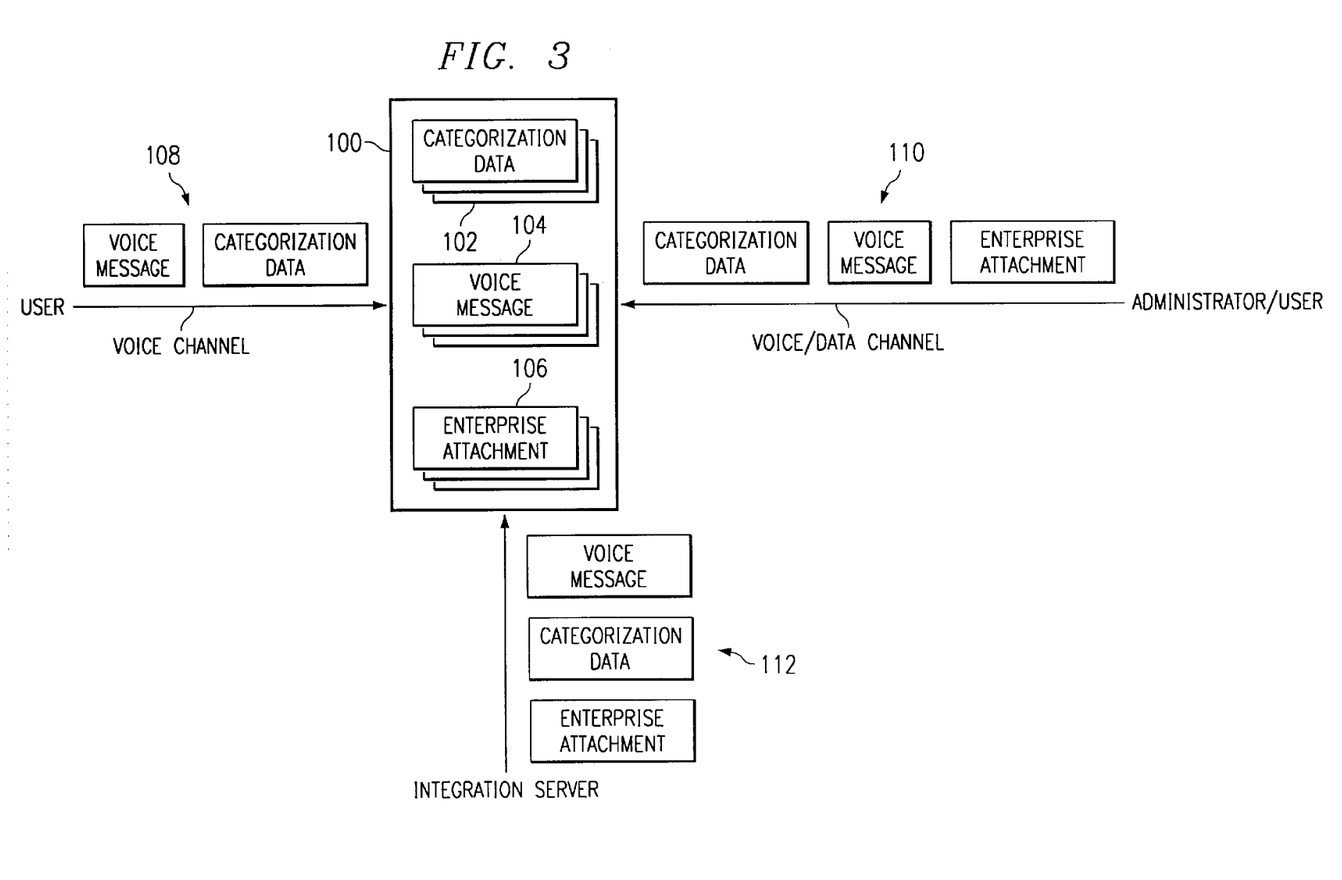
FIG. 3 is a block diagram illustrating exemplary information types maintained in an enterprise message and various methods for associating information within the enterprise message.

FIG. 3 is a diagram illustrating an exemplary data structure for an enterprise message 100 and potential sources of information in enterprise message 100. In the example illustrated, enterprise message 100 includes categorization data 102, voice messages 104, and enterprise attachments 106. In general, enterprise message 100 provides for the association of information from disparate information systems, such as voice and data systems.

As previously discussed, categorization data 102 includes any suitable information for describing enterprise message 100. For example, categorization data 102 may include time stamps, user identifiers, message priorities, information obtained from voice recognition, keywords obtained using speech to text technology, customer names, account names, message types (such as sales pipeline updates, sales questions or answers, or message replies), and any other suitable information for describing enterprise message 100 or detailing the association of enterprise message 100 with voice and/or data systems.

Enterprise message 100 also includes one or more voice messages 104. Voice messages 104 include voice recordings from one or more users recorded at any number of different times. For example, voice messages 104 may include messages and replies constituting a thread of voicemail messages. However, voice messages 104 in enterprise message 100 may be grouped according to any suitable criteria. For example, enterprise message 100 may include voice messages 104 based upon processing rules and/or instructions received from various users. Moreover, while the embodiment illustrates enterprise message 100 incorporating voice messages 104, system 10 contemplates enterprise message 100 maintaining any suitable information for accessing various voicemail messages. For example, enterprise message 100 may include one or more addressing links for accessing messages maintained in voicemail 24.

In addition to voice messages 104, enterprise message 100 also may include one or more enterprise attachments 106. Enterprise attachments 106 represent any suitable digital data files. Thus, enterprise attachments 106 may include application data files, such as Word documents, PowerPoint presentations, spreadsheets, and other suitable files. Moreover, enterprise attachments 106 may include executable files, customized data representations, and any other suitable information for association with voice messages 104 and categorization data 102. As with the storage of voicemail messages, enterprise message 100 may store some or all of enterprise attachments 106 as addressing links, such as links to information stored in various enterprise data systems 32.

As illustrated in this embodiment, enterprise message 100 may receive categorization data 102, voice messages 104, and enterprise attachments 106 through one or more methods. Through a voice channel, users access server 36 and supply voice messages and categorization data for inclusion within enterprise message 100, as indicated at 108. Through voice/data channels, users, such as an administrator, supply categorization data, voice messages, and/or enterprise attachments for inclusion within enterprise message 100, as indicated at 110. In addition, server 36 may automatically introduce categorization data, voice messages, and/or enterprise attachments into enterprise message 100, as indicated at 112, in response to various processing rules. Thus, enterprise message 100 may include categorization data 102, voice messages 104, and enterprise attachments 106 received from one or more sources at any suitable times.

For example, consider a sales representative contacting server 36 with a sales question regarding sales to large customers. Through a voice channel established with server 36, the sales representative supplies information for categorizing the sales question, such as the customer's name and information identifying the message as a sales question. Server 36 may elicit this information, for example, through a series of prompts requesting voice responses, dual-tone multi-frequency signals, and/or other suitable indications. In addition to providing the categorization data, the sales representative records a voice message, and server 36 generates an enterprise message containing the categorization data and voice message received from the sales representative. Depending on current processing rules in place, server 36 may automatically contact another system user, such as a manager for the sales representative, in order to provide a quick response to the sales question.

An administrator accesses server 36, potentially in response to a notification, and accesses the enterprise message containing the sales question from the representative. In response to the question, the administrator can attach voice messages, enterprise attachments, links to other enterprise messages, and may add further categorization data. For example, in response to the sales question, the administrator may attach a sample presentation suitable for sales to large clients. The administrator may then refer the enterprise message back to the sales representative that originated the question. In addition, the administrator may also use the resulting enterprise message for other tasks. For example, the administrator may generate a processing rule that links future questions with similar categorization data to this enterprise message, such that server 36 may automatically respond to similar questions.

Now consider that, in response to the answer from the manager, the sales representative successfully pitches the large client and contacts server 36 to generate an enterprise message reflecting the imminent success. During this session with server 36, the sales representative may generate a new enterprise message or simply augment the existing enterprise message by supplying new categorization data and a voice message. For example, the sales representative may supply categorization data indicating an increased opportunity win percentage and the scope of the potential sale. Based upon this opportunity win percentage, server 36 may identify processing rules that identify updates in one or more enterprise data systems 32.

For example, as previously discussed, upon identifying an opportunity win percentage that exceeds some threshold, server 36 may update ERP system 40 to reflect additional orders for components needed to fulfill the expected sale. However, before this data manipulation may occur, a processing rule may indicate that management approval is required. For example, a processing rule may instruct server 36 to notify a particular manager using an interactive session, during which server 36 presents information, such as the identity of the sales representative, the indicated opportunity win percentage, and other appropriate data, and requests approval from the manager. In response to receiving an approval, server 36 accesses the appropriate enterprise data systems 32 to manipulate data in response to the expected sales.

Therefore, as illustrated by this example, server 36 provides for a tight integration of voice and data systems and for the association of information for use is a variety of enterprise activities. For instance, while the preceding example describing a sales question and answer and a resulting sale illustrates the power of these techniques in coordinating communications, this association of information can provide valuable information for future transactions. Thus, server 36 may maintain this association of information as part of an enterprise knowledge base for any number of uses. For example, the manager may identify the sales question and answer and the resulting success in a sale as an appropriate training tool and forward the enterprise message to a training department. Thus, as evidenced by this relatively simple example, server 36 may use enterprise messages to provide an integration of voice and data systems that preserves context and the relevancy of links between various disparate types of information.

Figure 4:
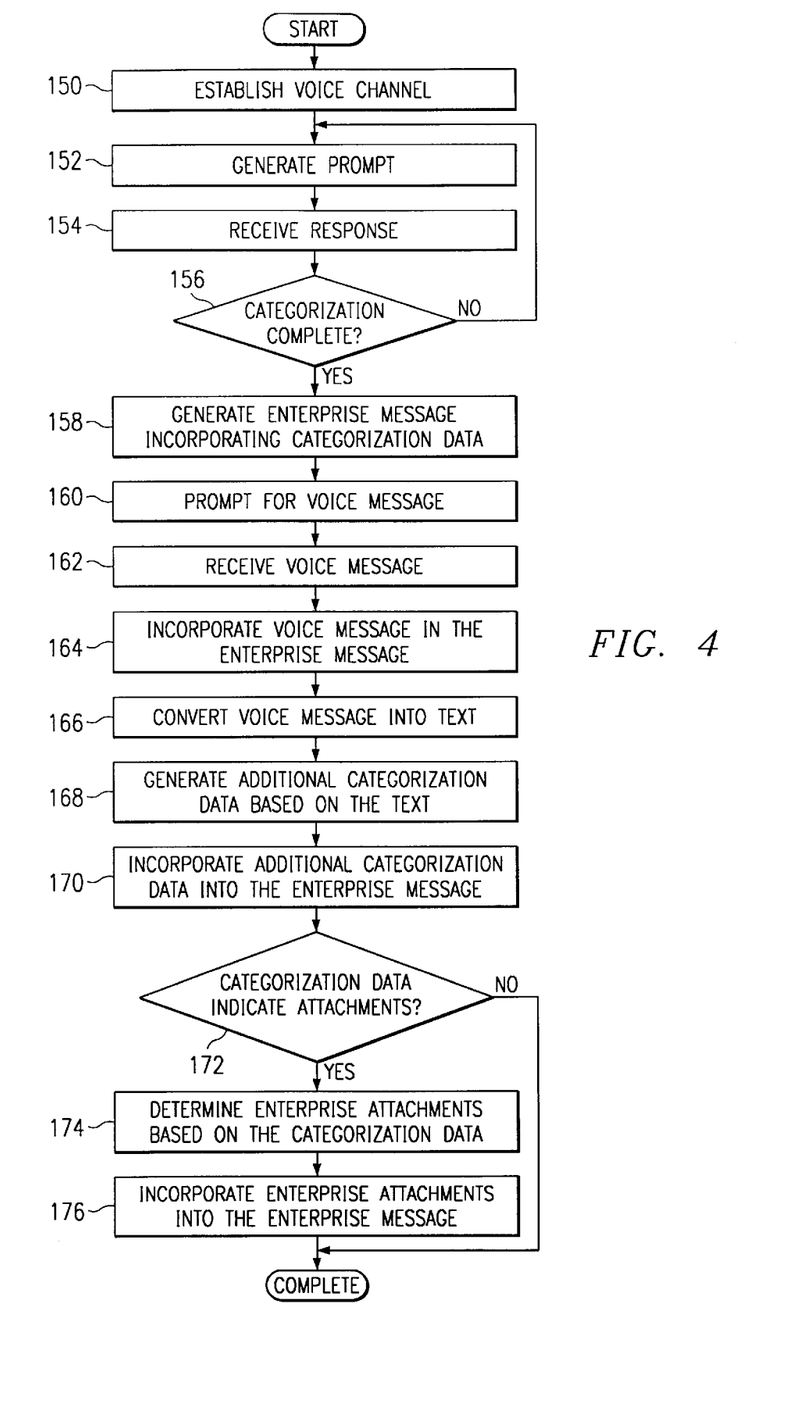
FIG. 4 is a flowchart illustrating a method for generating an enterprise message that includes various associated information.

FIG. 4 is a flowchart illustrating an exemplary method for generating and processing an enterprise message. Initially, server 36 establishes a voice channel with a user at step 150. Using the voice channel, server 36 communicates a prompt for categorization data to the user and receives a response at steps 152 and 154. Server 36 determines whether categorization is complete at step 156 and, if not, continues prompting the user for additional categorization data. For example, server 36 may generate a series of prompts to elicit categorization data for associating a voice message with data maintained in one or more of enterprise data systems 32. Upon completing categorization of the communications, server 36 generates an enterprise message incorporating the categorization data at step 158. In addition, server 36 prompts the user for a voice message and receives the voice message at steps 160 and 162. Server 36 incorporates the voice message into the enterprise message with the categorization data at step 164.

In addition to receiving categorization data from the user in response to various prompts, this example also illustrates server 36 generating categorization data based upon information in the voice message. Thus, server 36 converts the voice message into text at step 166 and generates additional categorization data based on the text at step 168. For example, server 36 may match the text against keyword indexed populated with information from enterprise data systems 32. Server 36 then incorporates this additional categorization data into the enterprise message at step 170. Therefore, server 36 may obtain categorization data through questions, prompts, or other suitable requests for information from the user and/or may determine categorization data from information embedded within the voice message received from the user.

During generation of an enterprise message, server 36 may also use categorization data to determine appropriate enterprise attachments for inclusion within the enterprise message. Thus, server 36 determines whether the categorization data identify particular enterprise attachments at step 172. For example, server 36 may access processing rules triggered by message creation to determine whether the categorization data for this enterprise message satisfy the conditional criteria and exceptions established for a processing rule. Thus, server 36 determines enterprise attachments based on the categorization data at step 174 and incorporates the enterprise attachments into the enterprise message at step 176. For example, server 36 may identify digital data files for incorporation within the enterprise message and store links to these digital data files in the enterprise message.

The preceding example illustrates a sample process for generating an enterprise message that may include categorization data, a voice message, and potentially one or more enterprise attachments. However, while this flowchart illustrates an exemplary method of operation, server 36 may use any suitable techniques for obtaining categorization data and voice messages from a user to generate an enterprise message. Therefore, many of the steps in this flowchart may take place simultaneously and/or in different orders than as shown. In addition, server 36 may use methods with additional steps, fewer steps, and/or different steps, so long as the methods remain appropriate.

Figure 5:
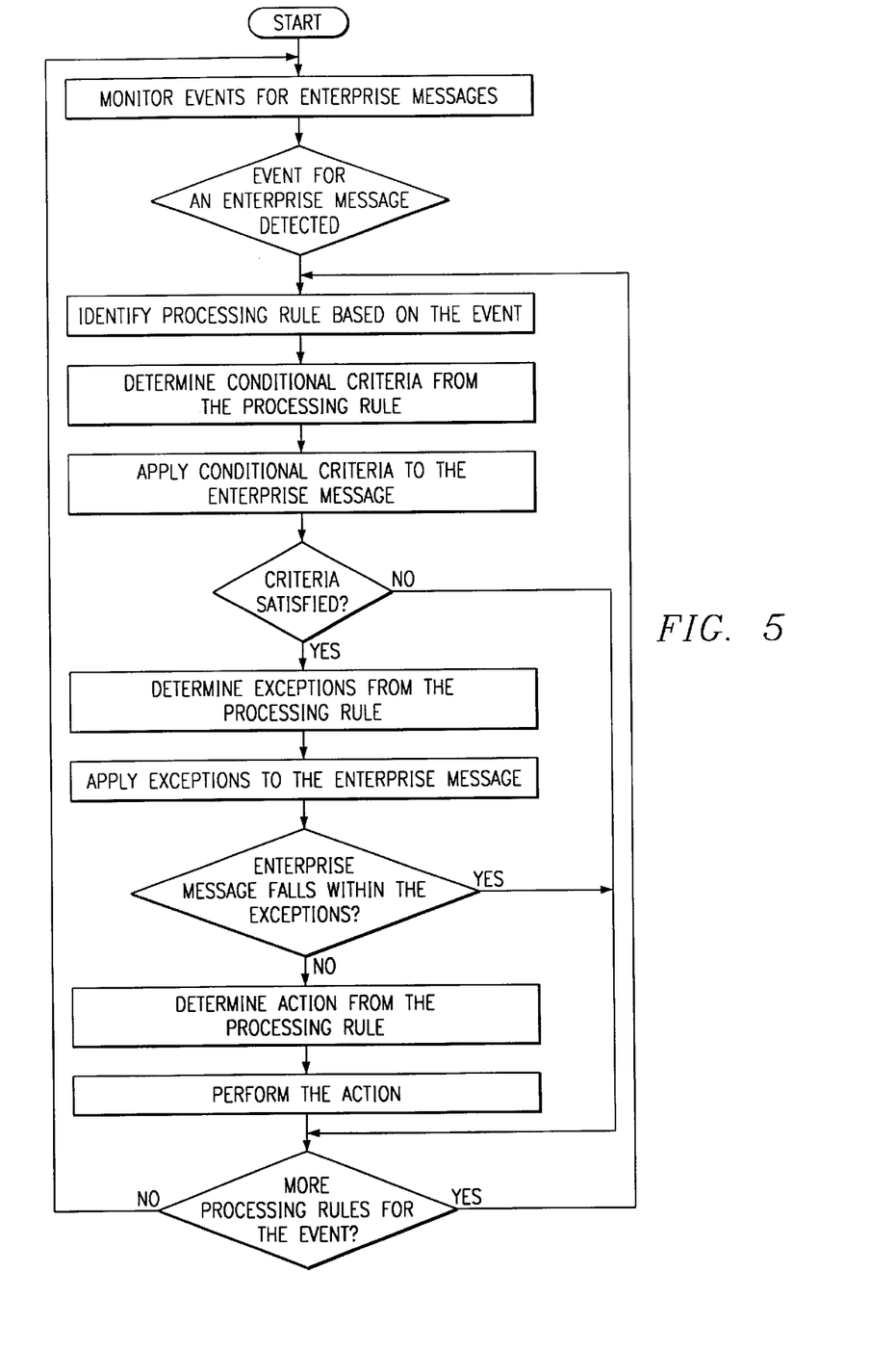
FIG. 5 is a flowchart illustrating a method for processing enterprise messages.

FIG. 5 is a flowchart illustrating a method for server 36 to monitor and process enterprise messages. Server 36 monitors enterprise messages and determines whether an appropriate event for an enterprise message has been detected at steps 200 and 202. For example, server 36 may monitor for the creation of new enterprise messages, timeouts on existing enterprise messages, modifications to enterprise messages, and other suitable events affecting messages.

Upon detecting an appropriate event for an enterprise message, server 36 applies processing rules triggered by the event to the enterprise message. Thus, server 36 identifies a processing rule triggered by the event at step 204. Server 36 determines the conditional criteria for the processing rule at step 206 and applies the conditional criteria to the enterprise message at step 208. This determines whether the categorization data satisfy the conditional criteria for the processing rule. If the criteria are satisfied at step 210, server 36 determines exceptions specified by the processing rule at step 212 and applies the exceptions to the enterprise message at step 214. This determines whether the categorization data fall within an exception established for the processing rule. For example, a processing rule may have an exception that excludes processing of an enterprise message given certain categorization data, such as categorization data indicating a low message priority. If the enterprise message does not fall within the exceptions at step 216, server 36 determines the action specified by the processing rule at step 218 and performs the action at step 220. For example, as previously discussed, a processing rule may specify any suitable action, such as message routings, notifications, data attachments, data manipulations, and other appropriate voice and/or data integration services.

If the conditional criteria for the processing rule are not satisfied, if the enterprise message falls within the exceptions of the processing rule, or after performing the specified action, server 36 determines whether additional rules for the given event remain to be checked against the categorization data of the enterprise message at step 222. If not, server 36 returns to monitoring events for enterprise messages at step 200. If more processing rules for the given event remain, server 36 applies the conditional criteria and exceptions from these processing rules to the categorization data of the enterprise message as previously discussed. Thus, given the occurrence of an event associated with an enterprise message, server 36 may apply one or more processing rules resulting in manipulations of the enterprise message, manipulations of other enterprise messages, manipulations of data in external systems, such as enterprise data systems 32, contacts with other users, such as notifications to managers, and/or any other appropriate actions.

However, as with the flowchart detailing the operation of server 36 with respect to message generation, this flowchart illustrates only an exemplary method of operation, and server 36 may use any suitable techniques for processing enterprise messages using rules triggered by various events. Thus, many of the steps in this flowchart may take place simultaneously and/or in different orders than as shown. In addition, server 36 may use methods with additional steps, fewer steps, and/or different steps, so long as the methods remain appropriate. Therefore, the examples provided by these flowcharts are merely illustrative, and system 10 contemplates server 36 using any suitable steps for generating and processing enterprise messages to integrate information from disparate systems.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for generating an enterprise message comprising:
    conducting an interactive session with a user to elicit categorization data;
    determining the categorization data based on information received from the user during the interactive session;
    receiving a voice message from the user;
    generating an enterprise message comprising the categorization data and the voice message;
    identifying a digital file stored in a data system based on the categorization data; and
    associating the digital file with the enterprise message.

2. The method of claim 1, wherein conducting the interactive session comprises:
    establishing a voice channel with the user;
    communicating a prompt on the voice channel;
    receiving a response to the prompt on the voice channel.

3. The method of claim 1, further comprising:
    accessing customer relationship management information maintained in the data system to determine valid responses for use in determining the categorization data; and
    determining a script for eliciting the categorization data based on the valid responses, the script comprising a plurality of prompts and associations between the prompts, the associations permitting the identification of a selected one of the prompts based on responses received from the user.

4. The method of claim 1, wherein the interactive session matches responses received from the user to customer accounts in the customer relationship management information, and the categorization data comprise a selected one of the customer accounts.

5. The method of claim 1, further comprising:
    converting the voice message into text;
    comparing the text to a keyword index, the keyword index developed from information maintained in the data system determining additional categorization data based on the comparison; and storing the additional categorization data in the enterprise message.

6. The method of claim 1, wherein the response is a selected one of a dual-tone multi frequency signal and a voice indication.

7. The method of claim 1, wherein identifying the digital file comprises:

presenting the enterprise message to an administrator; and receiving an indication to associate the digital file with the enterprise message, the indication received from the administrator.

8. The method of claim 7, further comprising:

receiving a second voice message from the administrator; and storing the second voice message in the enterprise message.

9. An integration server for generating an enterprise message, the server comprising:

a telephony services module operable to establish a voice channel with a user and to receive a voice message from the user;

a data services module operable to couple to a data system; and an integration module operable to:
 conduct an interactive session with a user to elicit categorization data;
 determine the categorization data based on information received from the user during the interactive session;
 receive a voice message from the user;
 generate an enterprise message comprising the categorization data and the voice message;
 identify a digital file stored in the data system based on the categorization data; and
 associate the digital file with the enterprise message.

10. The server of claim 9, further operable to conduct the interactive session by:

establishing a voice channel with the user;

communicating a prompt on the voice channel;

receiving a response to the prompt on the voice channel.

11. The server of claim 9, wherein the integration module is further operable to:

access customer relationship management information maintained in the data system to determine valid responses for use in determining the categorization data; and determine a script for eliciting the categorization data based on the valid responses, the script comprising a plurality of prompts and associations between the prompts, the associations permitting the identification of a selected one of the prompts based on responses received from the user.

12. The server of claim 9, wherein the interactive session matches responses received from the user to customer accounts in the customer relationship management information, and the categorization data comprise a selected one of the customer accounts.

13. The server of claim 9, wherein the integration module is further operable to:

convert the voice message into text;

compare the text to a keyword index, the keyword index developed from information maintained in the data system determine additional categorization data based on the comparison; and store the additional categorization data in the enterprise message.

14. The server of claim 9, wherein the response is a selected one of a dual-tone multi frequency signal and a voice indication.

15. The server of claim 9, wherein the integration module is further operable to identify the digital file by:

presenting the enterprise message to an administrator; and receiving an indication to associate the digital file with the enterprise message, the indication received from the administrator.

16. The server of claim 9, wherein the integration module is further operable to:

receive a second voice message from the administrator; and store the second voice message in the enterprise message.

17. Logic for generating an enterprise message, the logic encoded in media and operable when executed to:

conducting an interactive session with a user to elicit categorization data;

determining the categorization data based on information received from the user during the interactive session;

receiving a voice message from the user;

generating an enterprise message comprising the categorization data and the voice message;

identifying a digital file stored in a data system based on the categorization data; and associating the digital file with the enterprise message.

18. The logic of claim 17, further operable to conduct the interactive session by:

establishing a voice channel with the user;

communicating a prompt on the voice channel;

receiving a response to the prompt on the voice channel.

19. The logic of claim 17, further operable to:

access customer relationship management information maintained in the data system to determine valid responses for use in determining the categorization data; and determine a script for eliciting the categorization data based on the valid responses, the script comprising a plurality of prompts and associations between the prompts, the associations permitting the identification of a selected one of the prompts based on responses received from the user.

20. The logic of claim 17, wherein the interactive session matches responses received from the user to customer accounts in the customer relationship management information, and the categorization data comprise a selected one of the customer accounts.

21. The logic of claim 17, further operable to:

convert the voice message into text;

compare the text to a keyword index, the keyword index developed from information maintained in the data system;

determine additional categorization data based on the comparison; and store the additional categorization data in the enterprise message.

22. The logic of claim 17, wherein the response is a selected one of a dual-tone multi frequency signal and a voice indication.

23. The logic of claim 17, further operable to identify the digital file by:

presenting the enterprise message to an administrator; and receiving an indication to associate the digital file with the enterprise message, the indication received from the administrator.

24. The logic of claim 23, further operable to:

receive a second voice message from the administrator; and store the second voice message in the enterprise message.

25. An integration server for generating an enterprise message, the server comprising:
- means for conducting an interactive session with a user to elicit categorization data;
- means for determining the categorization data based on information received from the user during the interactive session;
- means for receiving a voice message from the user;
- means for generating an enterprise message comprising the categorization data and the voice message;
- means for identifying a digital file stored in a data system based on the categorization data; and
- means for associating the digital file with the enterprise message.

* * * * *